United States Patent [19]

Hanggi

[11] Patent Number: 4,518,274
[45] Date of Patent: May 21, 1985

[54] PEN WITH BUILT-IN ILLUMINATION

[76] Inventor: Rolf Hanggi, 22442 Walnut Cir. S., Cupertino, Calif. 95014

[21] Appl. No.: 523,346

[22] Filed: Aug. 22, 1983

[51] Int. Cl.³ .............................................. B43K 29/10
[52] U.S. Cl. .................................... 401/195; 362/118
[58] Field of Search ................. 401/195; 362/118, 109

[56] References Cited

U.S. PATENT DOCUMENTS

| 1,222,948 | 4/1917 | Hawthorne | 362/118 |
| 2,258,685 | 10/1941 | Mattlatzki | 362/118 X |
| 2,658,989 | 11/1953 | Marschat | 362/118 |
| 3,502,850 | 3/1970 | Kocham | 240/6.46 |
| 3,604,917 | 9/1971 | Schmidt . | |
| 3,963,914 | 6/1976 | Browning et al. | 240/6.46 |
| 4,016,414 | 4/1977 | Browning et al. | 240/6.46 |
| 4,028,540 | 6/1977 | Bajusz . | |
| 4,168,521 | 9/1979 | Bajusz | 362/118 |

FOREIGN PATENT DOCUMENTS

| 695801 | 9/1940 | Fed. Rep. of Germany | 362/118 |
| 978634 | 4/1951 | France | 362/118 |
| 1298682 | 6/1962 | France | 362/118 |
| 283432 | 1/1928 | United Kingdom | 362/118 |
| 709877 | 6/1954 | United Kingdom | 362/118 |
| 1001206 | 11/1965 | United Kingdom | 362/118 |

Primary Examiner—Steven A. Bratlie
Attorney, Agent, or Firm—Allston L. Jones; Joseph H. Smith

[57] ABSTRACT

Provided in a first embodiment of the invention is a writing implement having built-in illumination which includes a tubular pen body dimensioned to contain a small battery in contact with a terminal lightbulb. The lightbulb is held in place axially in the pen body typically by a corrugated metal bulb holder and by a translucent spacer extending to the end of the pen body where a marking element is located and opposite the end disposed to contain the battery. A metal spring-clip having a sliding portion mounted externally to the pen body is attached through the pen body wall and is disposed to make electrical contact with the battery therein. The sliding portion is free to slide down the exterior of the pen body wall and to make contact with the bulb holder through a hole in the pen body wall, thereby completing the circuit between the bulb and the battery using the length of the spring-clip as a primary conductive element in the system. Provided in a second embodiment is a writing implement having a built-in illumination system which is specially adapted for mounting to a surface such as a clipboard.

16 Claims, 4 Drawing Figures 4,518,274

PEN WITH BUILT-IN ILLUMINATION

FIELD OF INVENTION

This invention relates to writing implements having self-contained illumination, and such writing implements adapted for attachment to surfaces, such as clipboards.

BACKGROUND OF THE INVENTION

In many situations it is necessary to be able to take notes or to write when the illumination is insufficient to clearly see the paper being written upon, for example during slide or movie presentations, in the nursing units of hospitals in the middle of the night, and at night in an airplane cockpit.

Certainly this problem is not new, and there have been many devices proposed and constructed to solve it in the past. Examples of some of these prior art devices are disclosed in the following U.S. Patents, U.S. Pat. No. 3,502,850, "Writing and Lighting Instruments" by G. Kocham, issued Mar. 24, 1970; U.S. Pat. No. 3,604,917, "Ballpoint Pen Light", by Oron Laverne Schmidt, issued Sept. 14, 1971; U.S. Pat. No. 3,963,914, "Combination Writing Implement and Flashlight", by Scott M. Browning, issued June 15, 1976; U.S. Pat. No. 4,016,414, "Writing Device Incorporating Illuminating Means", by Scott M. Browning, issued Apr. 5, 1977; U.S. Pat. No. 4,028,540, "Flashlight Marking Implement", issued June 7, 1977; and U.S. Pat. No. 4,168,521, "Writing Implement With Self-contained Illumination", by Harold F. Bajusz, issued Sept. 18, 1979.

In these prior art systems, it is typical to provide a light bulb and battery combination, the typical means of affecting electrical connection between the battery and the light bulb being by a pressure activated switching system. Such connection is conventionally made either by activating a separate switch or by moving the pen body or cap to force physical connection between the battery and other electrical conductors in the system. Also, some have used a spring-clip, for example as might be used to frictionally hold the pen inside a shirt pocket, as the movable element of a switch. However, none of these systems uses the length of the spring-clip as an electrically conductive element in the switching system for making electrical contact between the battery and the lightbulb. In addition, none of these devices is particularly well adapted to be mounted on a clipboard, a convenience that would be very useful.

SUMMARY OF THE INVENTION

In a first embodiment of the invention, a writing implement is provided having built-in illumination which includes a tubular pen body dimensioned to contain a small battery in contact with a terminal lightbulb. The lightbulb is held in place axially in the pen body typically by a corrugated metal bulb holder and by a translucent spacer extending to the end of the pen body where a marking element is located and opposite the end disposed to contain the battery. A metal spring-clip having a sliding portion mounted externally to the pen body is attached through the pen body wall and is disposed to make electrical contact with the battery therein. The sliding portion is free to slide down the spring clip and to make contact with the bulb holder through a hole in the pen body wall, thereby completing the circuit between the bulb and the battery using the length of the spring-clip as a primary conductive element in the system.

In a second embodiment, a writing implement is provided having a built-in illumination system which is specially adapted for mounting to a surface such as a clipboard. In this embodiment an external tubular housing is used for such mounting of the device and disposed for holding batteries and a switching system. The switching system is made up of a second hollow tubular housing constructed of a conductive material disposed for housing the batteries and for making electrical contact with one terminal of the batteries. The switching system also includes a third tubular housing constructed of a nonconductive material for holding a removable marking pen having a built-in bulb for illumination. The third tubular housing is slidably mounted within the external tubular housing and is biased apart from the second tubular housing by a spring. Upon compressing the spring by sliding the third tubular housing toward the batteries, a shorter second spring mounted on the third tubular housing physically engages the other terminal of the batteries and by means of a wire makes electrical connection to one terminal of the bulb in the marking pen thereby completing the electrical circuit. The connector to the other terminal of the lightbulb is affected by a spring-clip element attached to the third tubular housing which makes electrical contact with the second tubular housing and is connected to the other terminal of the bulb by a wire. At substantially the same time that the second spring makes contact with one terminal of the batteries, the spring-clip element latches the relative positions of the second and third tubular housings in place. The circuit is then broken by sliding the marking pen deep enough into the third tubular housing so that it engages a portion of the spring-clip element extending into the interior of the third tubular housing, thereby releasing the latching effect of the spring-clip element.

DETAILED DESCRIPTION OF THE INVENTION

Figure 1A:
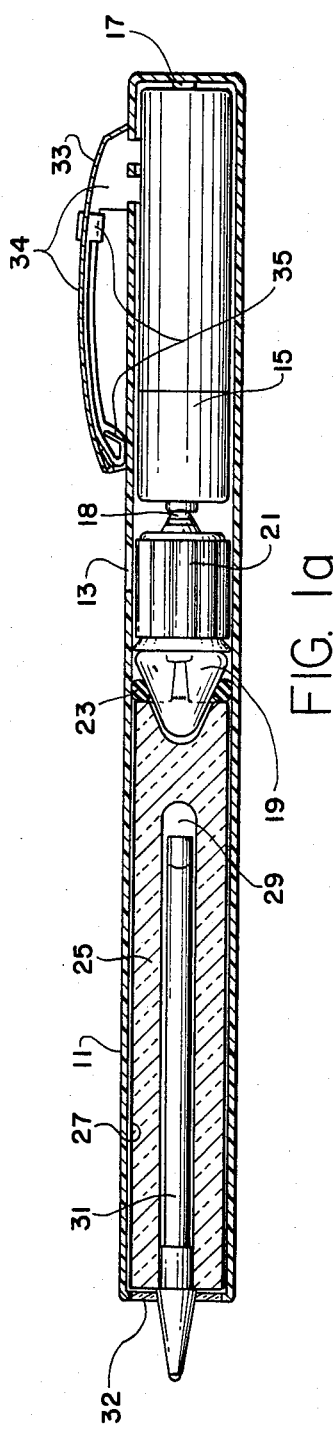
FIG. 1A shows a first embodiment according to the invention.
Figure 1B:
FIG. 1B shows an end view of a bulb holder of FIG. 1A.

In accordance with preferred embodiments of the invention, there is shown in FIG. 1A a first design for an illuminated pen. Making up the device is a tubular pen housing 11, typically constructed of an opaque nonconductor such as colored plastic, having a hole 13 therein on one side. Within the housing is contained a small battery 15 of the type having a metal case, except that the outer insulative coating generally found on such batteries has been removed so that negative terminal of the battery comes in contact with the interior surface of the housing 11. The negative terminal of the battery is firmly pushed against a stop 17 at the end of the housing, while the positive terminal is adjacent an electrical contact 18 at the base of an incandescent bulb 19 which is mounted coaxially within the housing. A bulb holder 21, constructed of an electrically conductive material such as spring-metal or copper and having a corrugated surface, surrounds the base of bulb 19 making electrical contact therewith. Bulb holder 21 also maintains the bulb in a stable coaxial position within the tube as well as acting as an electrical contact, as will be discussed shortly. (The end of bulb holder 21 is shown in FIG. 1B.) An O-ring 23, typically of latex rubber soft plastic or other soft but resilient material, is used to cushion the glass crown of the bulb 19, and acts as a stop between a spacer 25 and the bulb 19. Spacer 25 is of cylindrical shape and is typically constructed of a material such as polymerized methyl methacrylate or other transparent or translucent synthetic resin in order to propagate light from bulb 19 to the writing end of the pen. Except on the end where the bulb is introducing light into the spacer and where light is to be emitted, the external surface of spacer 25 may be covered with a light-reflective coating 27, such as reflective paint, metal foil or the like, in order to maximize the lighting efficiency at the end of the pen. In addition, spacer 25 is typically constructed with a first cavity 29 for holding a marking cartridge 31 such as that used for a pen or a mechanical pencil, and a second cavity shaped to accept the glass crown of bulb 19. However it should also be noted that for many of the marking cartridges in common use, cavity 29 itself could be integrated with the cartridge wall, for example to serve as an ink reservoir. Marking cartridge 31 and spacer 25 are typically glued into place along with a translucent plastic annular ring 32 which acts as an end cap and serves as a diffuser to provide relatively uniform illumination where marking is to occur.

The switching system for the bulb is provided by a combination spring-clip 33, typically constructed of metal, which extends through tubular housing 11 and makes direct electrical contact with the outer case of the battery. Spring-clip 33 is made up of two separate parts, a base-spring section 34 which is attached to the pen housing, and a movable spring portion 35 slidably mounted on the base-spring section and disposed between it and the pen housing. The switching action is accomplished by sliding spring portion 35 toward and into hole 13 on the side of pen housing 11, spring portion 35 being held firmly in place by the spring force exerted by base-spring section 34. Once in hole 13, electrical connection is made between the battery and the bulb via bulb holder 21. Electrical connection is broken simply by moving spring portion 35 back up along base-spring section 34 and out of hole 13. In other respects, spring-clip 33 is conventional in that it is configured to provide a firm frictional clasp to a surface such as a shirt pocket.

Figure 2:
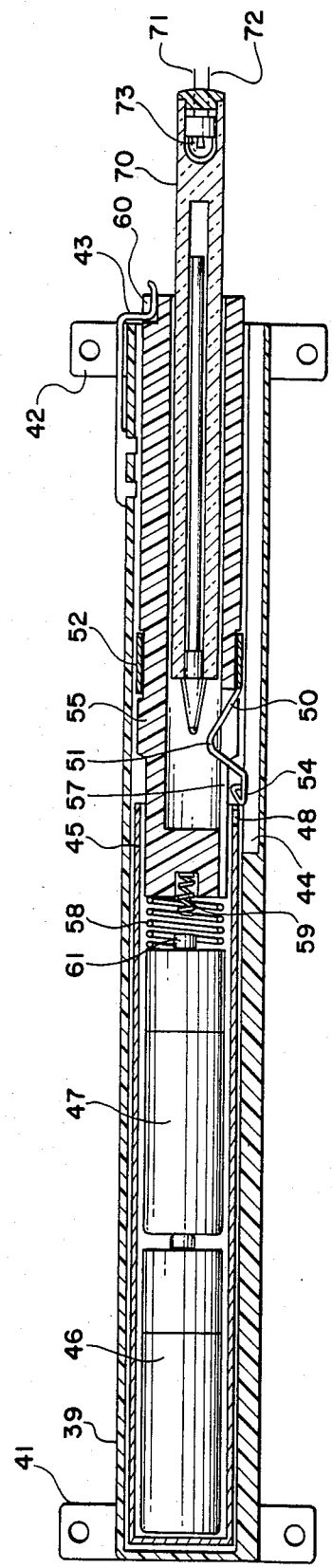
FIG. 2 shows a second embodiment according to the invention.
Figure 3:
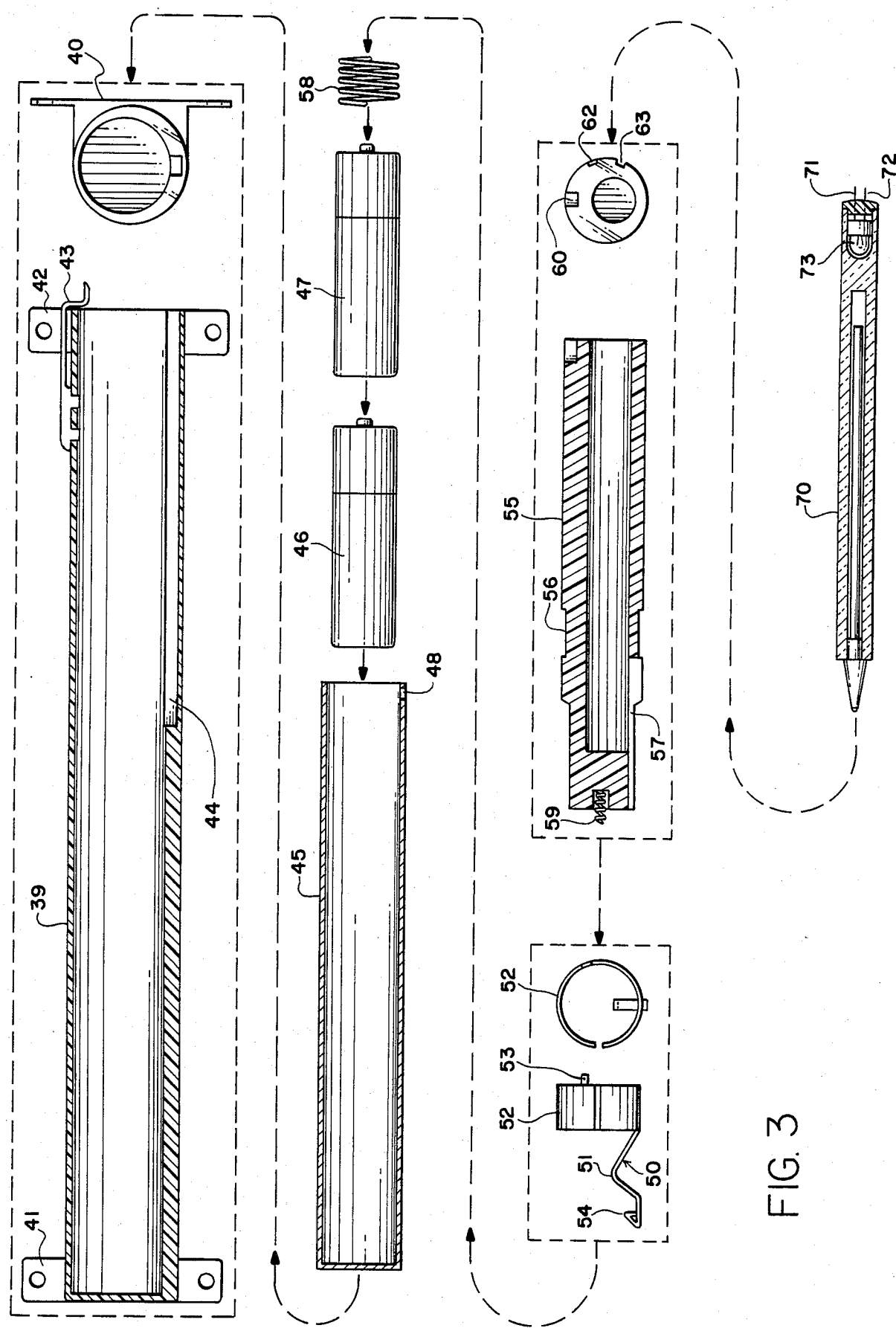
FIG. 3 shows an expanded view of the second embodiment depicted in FIG. 2.

Another embodiment of the invention which is particularly adapted to mounting on a flat surface, such as a clipboard, is shown in FIG. 2 and in an expanded view in FIG. 3. This embodiment includes a nonconductive tubular housing 39, having a substantially flat surface 40 on one side and flanges 41 and 42 with which to attach the housing to a flat surface, and a spring 43 for holding other elements of the pen system within the housing. Spring 43 is typically made of a resilient material such as spring steel or plastic so that it may be pulled clear to enable removal of other elements from the interior of the housing. Included in the device is a second tubular housing 45 which is constructed of a conductive material, such as a metal, for housing batteries 46 and 47 each having an insulating outer jacket and for providing electrical contact with a metal spring clip 50. The means of securing spring clip 50 is a cylindrical nonconductive pen holder 55, typically plastic, having an annular ring removed to provide a cut-out section 56 to accommodate a ring portion 52 of spring clip 50. A portion of pen holder 55 is removed to provide a cut-out 60 which is used as a lock to ensure proper alignment of the third tubular housing when engaged by spring 43. Pen holder 55 also has an inner cylindrical bore for housing a pen 70 and a slot 57 for permitting a portion 51 of spring clip 50 to extend into the inner bore of pen holder 55. Disposed between the batteries and pen holder 55 are two springs, a larger spring 58 for providing a restraining force on the batteries and the pen holder, and a smaller spring 59 attached to the pen holder for making electrical contact with the positive terminal 61 of battery 47. Two wires (not shown), one connected to electrical terminal 53 of spring clip 50 and one attached to spring 59, are connected to terminals 71 and 72 of an incandescent bulb 73 located in the distal end of pen 70. Conduits are provided for the wires via grooves 63 and 62 in pen holder 55.

The switching function in this second embodiment is accomplished by pushing pen holder 55 toward the batteries to establish electrical contact between the positive terminal of battery 47 and spring 59. As the pen holder 55 is pushed toward the batteries, a latch portion 54 of spring clip 50, which has a sloping front surface, is pushed downward and along groove 44 of housing 41 until the latch portion engages a hole 48 located within the wall of second tubular housing 45, thereby locking the pen holder into position and maintaining electrical contact between battery 47 and spring 59. To release the latch portion from hole 48, the pen is inserted deeply enough into the bore of pen holder 55 to engage portion 51 of spring clip 50, which extends into the bore thereof when latch portion 54 is engaged in hole 48. The pen holder 55, biased by spring 58 then moves back down housing 41, away from batteries 46 and 47, until spring 43 is again engaged.

The construction of the pen itself is traditional and typically includes a pen housing of a translucent material for holding the marking portion and marking fluid or lead, and for propagating light to the writing surface from the distal end where the bulb is located.

While there has been shown and described the preferred embodiments of the present invention, it will be apparent to those skilled in the art that many changes and modifications may be made without departing from the invention in its broader aspects. Therefore, the appended claims are intended to cover all such modifications and changes that fall within the true spirit and scope of the invention.

What is claimed is:

1. A writing implement having a built-in illumination system comprising:

a tubular housing of an electrically nonconductive material having a first opening on one end and a second opening on its periphery, said tubular housing defining a compartment for receiving a battery located within said tubular housing opposite said end having said first opening;

lamp means disposed to be located within said tubular housing for providing illumination in the direction of said first opening, said lamp means having first and second electrical contacts with said first electrical contact having an electrical path to said second opening and said second electrical contact being disposed to interconnect with the positive terminal of a battery within the tubular housing;

marking means disposed to be located at least partially within said tubular housing and to extend through said first opening for providing a mark on a surface when touched to said surface;

spring-clip means constructed of an electrically conductive material including a fixed portion and a slidable portion, said fixed portion being fixedly attached to said tubular housing and extending into the interior of said tubular housing wherein it is disposed to make direct electrical contact with an electrically conductive portion of the case of a battery therein, said slidable portion being slidably affixed to the fixed portion on the exterior of said tubular housing and having a maximum possible displacement extending at least to said second opening in said tubular housing for providing an electrical path which is substantially exterior to said tubular housing between said second opening and said electrically conductive portion of said battery case via said spring-clip means when said slidable portion is displaced to said second opening.

2. A device as in claim 1 wherein said spring-clip means is comprised of a resilient material.

3. A device as in claim 2 wherein said spring-clip means is for attaching said writing implement to a surface by frictional contact.

4. A device as in claim 3 wherein the second electrical contact of said lamp means is disposed to make direct physical contact with the positive terminal of a battery inserted within said tubular housing.

5. A device as in claim 4 further comprising lamp holder means constructed of an electrically conductive material having a corrugated surface for holding said lamp means axially within said tubular housing and for providing electrical connection from said first electrical contact of said lamp means to the proximity of said second opening.

6. A device as in claim 5 further comprising spacer means located within said tubular housing constructed of a translucent material for positioning said lamp means approximately at said second opening, and for transmitting light from said lamp means to said first opening.

7. A device as in claim 6 further comprising an O-ring constructed of a resilient material located between said spacer means and said lamp means for cushioning the force on said lamp means caused by said spacer means and by physical contact with the positive terminal of a battery which said tubular housing is disposed to contain.

8. A writing implement having built-in illumination adapted for mounting on a surface comprising:

a first tubular housing of an electrically nonconductive material;

attachment means for mounting said first tubular housing to a surface;

a second tubular housing constructed of an electrically conductive material disposed to receive a voltage source having two terminals, with a first terminal of said voltage source in electrical contact with said second tubular housing, said second tubular housing having a first opening on one end and an engagement element on its periphery, said second tubular housing dimensioned to fit within said first tubular housing;

a third tubular housing construction of an electrically nonconductive material slidably mountable within said first tubular housing extending through said first opening into at least a portion of said second tubular housing;

first spring means locatable between said voltage source and said third tubular housing for providing a restraining force to bias said voltage source and said third tubular housing in spaced-apart relationship one from the other;

retaining means affixed to said first tubular housing for holding said third tubular housing within said first tubular housing at a nominal position;

marking means slidably mountable at least partially within said third tubular housing, for marking on a surface touched thereto when said marking means is removed from within said third tubular housing, said marking means comprising lamp means having a first lead and a second lead for providing illumination when a voltage is applied between said first and second leads;

contact means attached to said third tubular housing for making electrical contact with a second terminal of said voltage source when said third tubular housing is moved a predetermined distance from said nominal position within said first housing toward said voltage source compressing said first spring means, said contact means electrically connectable to said first lead of said lamp means;

spring-clip means attachable to said third housing and constructed of an electrically conductive material for coacting with said engagement element of said second tubular housing to latch said third tubular housing in a fixed position relative to said second tubular housing when said contact means makes electrical contact with said second terminal of said voltage source, said spring-clip means electrically connectable to said second lead of said lamp means and making electrical connection to said second tubular housing when coacting with said engagement element.

9. A device as in claim 8 wherein said spring-clip means comprises a first portion extending within the interior of said third tubular housing which coacts with said marking means to release said third tubular housing from said fixed position when said marking means is moved within said third tubular housing toward said second tubular housing and engages said first portion of said spring-clip means.

10. A device as in claim 9 wherein said engagement element is an opening in the wall of said second tubular housing.

11. A device as in claim 10 wherein said spring-clip means further comprises a latch portion for extending into said opening in the wall of said second tubular housing.

12. A device as in claim 11 wherein said spring-clip means is an integral piece of a resilient material.

13. A device as in claim 11 wherein said contact means comprises a spring.

14. A device as in claim 13 wherein said first spring means comprises a coil spring.

15. A device as in claim 14 wherein the wall of said third tubular housing has a portion removed therefrom to permit said retaining means to engage said third tubular housing by extending into said removed portion.

16. A device as in claim 15 wherein said retaining means comprises a resilient material for permitting said retaining means to be pulled clear of said third tubular housing in order that said third tubular housing can be removed from said first tubular housing.

* * * * *